US011512953B2

(12) United States Patent
Zhang et al.

(10) Patent No.: US 11,512,953 B2
(45) Date of Patent: Nov. 29, 2022

(54) ALTITUDE ESTIMATION FOR AERIAL VEHICLES

(71) Applicant: SZ DJI TECHNOLOGY CO., LTD., Shenzhen (CN)

(72) Inventors: Fu Zhang, Shenzhen (CN); Mingyu Wang, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 262 days.

(21) Appl. No.: 16/704,708

(22) Filed: Dec. 5, 2019

(65) Prior Publication Data
US 2020/0109944 A1 Apr. 9, 2020

Related U.S. Application Data

(63) Continuation of application No. PCT/CN2017/099099, filed on Aug. 25, 2017.

(51) Int. Cl.
| | |
|---|---|
| *G01C 5/06* | (2006.01) |
| *B64C 39/02* | (2006.01) |
| *G01C 21/12* | (2006.01) |
| *G08G 5/00* | (2006.01) |
| *G01C 21/20* | (2006.01) |

(52) U.S. Cl.
CPC .............. *G01C 5/06* (2013.01); *B64C 39/024* (2013.01); *G01C 21/12* (2013.01); *G08G 5/0069* (2013.01); *B64C 2201/14* (2013.01); *G01C 21/20* (2013.01)

(58) Field of Classification Search
CPC .......... G01C 5/06; G01C 21/12; G01C 21/20; B64C 39/024; B64C 2201/14; G08G 5/0069
See application file for complete search history.

(56) References Cited

U.S. PATENT DOCUMENTS

| | | | |
|---|---|---|---|
| 9,903,779 B2* | 2/2018 | Hammerschmidt | .. G01L 9/0072 |
| 2017/0267372 A1* | 9/2017 | Donnard | .............. B64C 1/0009 |
| 2018/0077350 A1* | 3/2018 | Grenier | ................. H04N 5/247 |
| 2020/0143178 A1* | 5/2020 | Bomphrey | ........... B64C 39/024 |

FOREIGN PATENT DOCUMENTS

| | | |
|---|---|---|
| CN | 103364785 A | 10/2013 |
| CN | 105388906 A | 3/2016 |
| CN | 105865702 A | 8/2016 |
| EP | 1843127 A2 | 10/2007 |
| GB | 2563935 A * | 1/2019 ............. B64C 13/16 |
| JP | 2013052723 A | 3/2013 |
| WO | 2010069934 A1 | 6/2010 |
| WO | WO-2017045141 A1 * | 3/2017 ........... B64C 39/024 |

OTHER PUBLICATIONS

The World Intellectual Property Organization (WIPO) International Search Report and Written Opinion for PCT/CN2017/099099 dated May 25, 2018 7 pages.

* cited by examiner

*Primary Examiner* — Aniss Chad
*Assistant Examiner* — Christine Nguyen Huynh
(74) *Attorney, Agent, or Firm* — Anova Law Group, PLLC

(57) ABSTRACT

A method for determining an altitude of a moving object includes obtaining pressure-dependent data from a plurality of sensors and computing the altitude of the moving object based on the pressure-dependent data from the plurality of sensors. Each of the sensors is mounted on the moving object with a respective primary orientation direction, and the primary orientation directions of at least two of the sensors are different.

20 Claims, 11 Drawing Sheets

US 11,512,953 B2

ALTITUDE ESTIMATION FOR AERIAL VEHICLES

CROSS-REFERENCE TO RELATED APPLICATION

This application is a continuation of International Application No. PCT/CN2017/099099, filed Aug. 25, 2017, the entire content of which is incorporated herein by reference.

FIELD OF THE DISCLOSURE

This disclosure relates to operation of unmanned aerial vehicles and in particular to altitude estimation.

BACKGROUND OF THE DISCLOSURE

Unmanned Aerial Vehicles (UAVs), also known colloquially as "drones", are becoming increasingly common sights in the skies above sporting and recreational events, natural and man-made landmarks, parks and other features and structures. Indeed, the range of uses of commercial UAVs is growing rapidly, encompassing not only recreational uses, but also professional, such as for photography and videography, scientific, law-enforcement, and many others.

Users are typically able to manually control the altitude above ground of a UAV by operating power and/or directional controls on a controller, but in some cases it is desirable for a UAV to be able to determine altitude automatically. Even for manual operation, users may wish to know quantitatively the altitude, in particular height-above-ground of their UAVs. For example, the ability to maintain a set height above ground may be important to keep an object at a proper size in the field of view of an onboard camera, or for other station-keeping reasons. As another example, a UAV may be used specifically to determine the height of some object. As yet another example, a display or automatic limitation of altitude may be important to ensure that a UAV does not exceed a maximum legal height above ground, such as in a controlled airspace. Above-ground altitude determination may also be incorporated in some UAVs for an even more fundamental purpose, namely, to automatically prevent a careless or inexperienced user from crashing the UAV into the ground. Similarly, if a UAV incorporates a terrain map, altitude determination may be used to ensure constant-height terrain following. In short, there are many reasons one might want a UAV to be able to estimate its altitude relative to some reference height.

One common way to determine the height-above-reference of a UAV is for it to include some form of pressure sensor. After either fixed or updatable calibration to some reference pressure, circuitry onboard the UAV or in its controller may then compare actual measured pressure with the reference pressure and compute height as a function of the pressure difference. The pressure field around a UAV, however, is very often non-constant, even when the UAV is hovering at a constant height with no wind. For example, propeller downwash can lead to rapidly varying sensed pressure. This problem is compounded in other flight contexts, in which the apparent wind on the UAV includes not only propeller downwash, but also potentially fluctuating velocity components of air in all three directions caused not only by the meteorological wind, but also by the motion of the UAV itself. Such changes in sensed pressure then translate into errors in the determination of altitude.

Some known attempts to reduce these errors involve pre-calibration of the single onboard barometer (including a pressure sensor) by applying carefully-designed algorithms, which try to compensate for assumed errors at different relative UAV airspeeds. Note that the apparent wind variation may be relatively high since UAV velocity—even vertical, especially upon descent—is often roughly the same as wind velocity. The calibrated data is then stored in the onboard electronics of the UAV. When the UAV is in actual flight, this conventional method estimates the UAV's airspeed and computes the amount of barometer error by interpolating the calibration data. The raw barometer readings are subtracted by the error estimate to produce a corrected altitude measurement for further processing.

The compensation accuracy of this known method depends on several factors, including the airspeed estimation and the calibration process itself. Calibration error and noisy airspeed measurements, however, often lead to unacceptable, or at best undesirable, altitude estimation errors, especially for civilian UAVs.

It would therefore be advantageous for a UAV to be able to more accurately determine altitude even in the presence of a non-constant and often noisy pressure field.

DETAILED DESCRIPTION

In broad terms, embodiments of this disclosure provide for altitude estimation for a moving object such as a UAV, based on the weighted contributions of signals from multiple sensors that are mounted so as to reduce errors stemming from differences in the sensed pressure field around the object due, for example, to different apparent air velocities.

In the description below, the sensors are primarily pressure sensors, but this is only by way of a common example. With changes that are either mentioned explicitly, or will be apparent to skilled UAV designers, the sensors could also output any type of pressure-dependent data from which an altitude value can be determined; barometric altimeters, for example, output altitude values directly.

"Altitude" (in some contexts referred to as "elevation") may be defined in different ways. For example, an absolute vertical distance computed in a direction that is normal to the surface of a geoid is used in various satellite-based systems such as GPS. Altitude measurements based on gas (such as air) pressure differences (sometimes referred to as "pressure altitude") are sometimes referenced to mean sea level pressure (AMSL—"altitude above mean sea level"). Still other systems compute altitude relative local ambient pressure at a reference altitude or "zero level", such as at local ground position, in which case "altitude" is height above ground level (HAGL). Embodiments described below may operate with any definition of "altitude" that is based on measurement of pressure differences relative to some chosen reference. For the sake of simplicity, and without limitation, and because it will usually be of most practical use, altitude is taken below to be HAGL. Adjustments to, for example, AMSL, or any other zero-level reference altitude may be made by changing the reference pressure and assumed zero-level height and will be within the skill of UAV designers.

Figure 1:
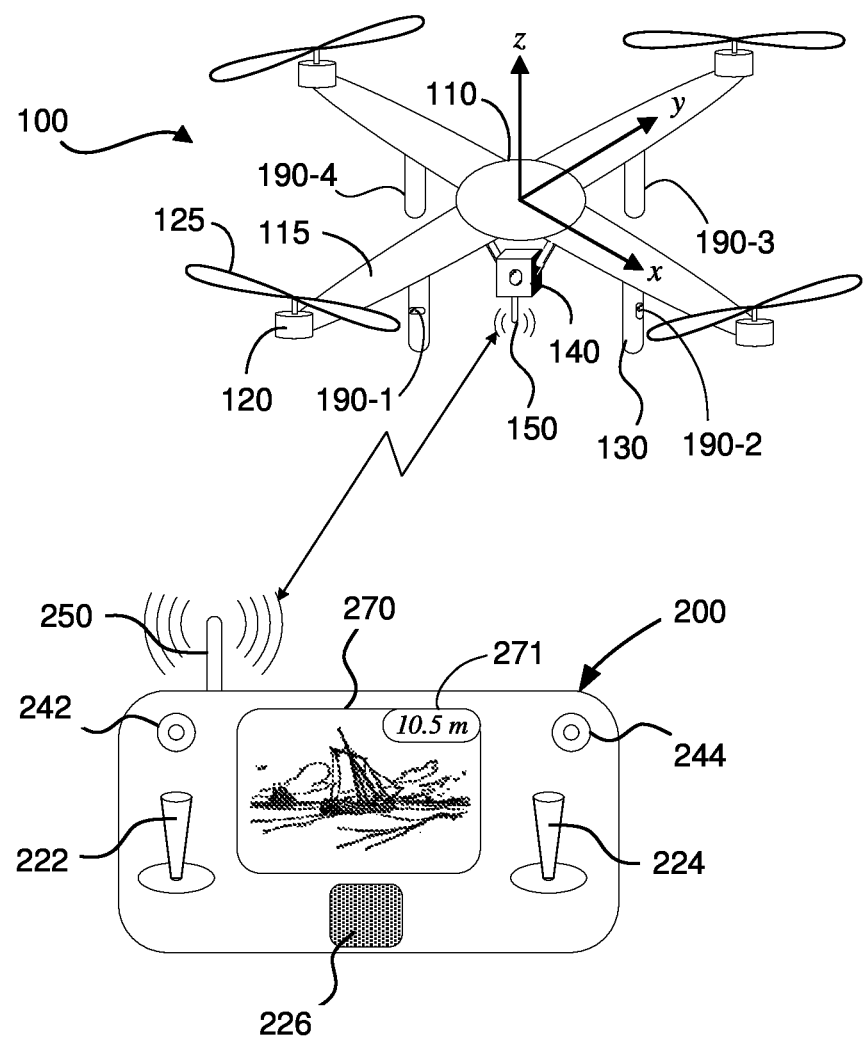
FIG. 1 illustrates an example of a UAV and its controller.

Modern commercial and recreational UAVs take many shapes and forms. FIG. 1 illustrates the main structural features of one example of a UAV. The UAV 100 illustrated in FIG. 1 includes a central body or hub 110 that typically also comprises a housing for the circuitry used to control the UAV. Located on a plurality of supporting structures such as a frame, arms, struts, etc., 115 are respective motors 120, each of which drives at least one propulsion device. As shown in FIG. 1, the propulsion devices are propellers 125, which is the most commonly seen type, although some UAVs have been proposed that used ducted fan arrangements or other alternatives.

Although embodiments are described below in the context of the common "quad-copter" configuration shown in FIG. 1, the general techniques described do not presuppose such a configuration; rather, any modifications necessary to adapt the techniques described below to UAVs having more or fewer propellers will be apparent to skilled designers. This includes even single-rotor UAVs, that is, helicopters. In fact, the moving object need not even be propelled, but could also be UAVs such as gliders, balloons, or even probes dropped from aircraft, precision altimeters used in skydiving, etc.

Figure 6:
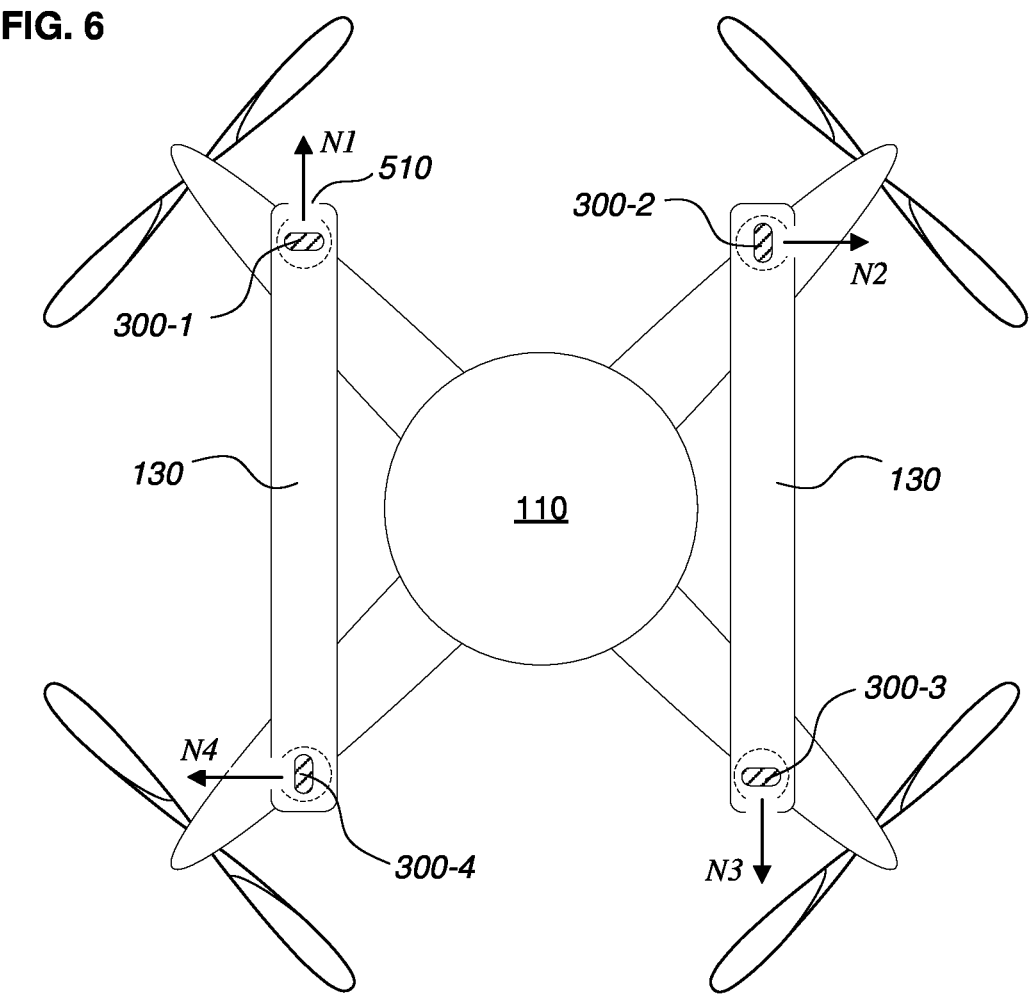
FIGS. 6-8 illustrate different mounting arrangements for multiple pressure sensors.

Some form of landing gear or similar supporting structure is generally also provided. In FIG. 1, these are legs 130, although some UAVs have rails, a box frame structure, etc., to make it easier for a user to hold and retrieve the UAV. FIG. 6, for example, illustrates a UAV with twin landing rails instead of legs.

One common use of recreational and commercial UAVs is aerial photography and/or videography. Such UAVs therefore include at least one a camera 140, which may be either fixed or movable, for example, on gimbals with actuators for changing the angle of view.

In the embodiment illustrated in FIG. 1, pressure-sensing components 190-1, 190-2, 190-3, and 190-4 (of which two are not visible) are included, one in each leg 130. As is discussed below, the number and placement of these pressure-sensing components may vary, and may comprise not only pressure sensors, but also some kind of apertures that expose the respective pressure sensors to the air pressure at the aperture, any circuitry and/or wiring included along with the pressure sensors themselves to condition the output signal from the pressure sensors for transmission to processing circuitry, etc. Below, for convenience, the pressure sensors and apertures are referenced collectively as 300 and 510, respectively.

Although there are some totally autonomous UAVs, especially in advanced uses, most commercial and recreational UAVs are controlled by a user, who operates a controller 200. The UAV therefore usually includes a wireless communication system such as a radio frequency transmitter or transceiver with either an internal or external antenna 150.

To fly the UAV and operate its various features, controllers typically include one or more user-operable devices such as joysticks 222, 224, sometimes various buttons 242, 244 not only to turn the controller on and off, but to select other features, and sometimes additional I/O devices such as a trackpad 226. An antenna 250 may be either built into the controller or extend externally to transmit and receive the radiofrequency signals sent to and from the UAV. Although some simple UAVs do not enable a user to view real-time images captured by the camera 140, many do. In such cases, the controller 200 generally includes a display screen 270 on which the user can see images, including video, transmitted down from the UAV. The controller may also include a display field 271 that displays the UAV's current HAGL. As with many other common devices, the display screen 270 itself may be a touchscreen, such that it too can be used as an input device.

Embodiments of this disclosure do not require any particular structure or technology for the pressure sensors 300. Nonetheless, one technology that is particularly advantageous because of its small size, robustness, accuracy, and ease of mounting is known as MEMS, which is short for "micro-electromechanical systems". A MEMS pressure sensor is illustrated in simplified form in FIGS. 2A-2C in part to show how such a sensor is constructed and operates, but also to illustrate how it may be mounted with a particular orientation.

Figure 2A:
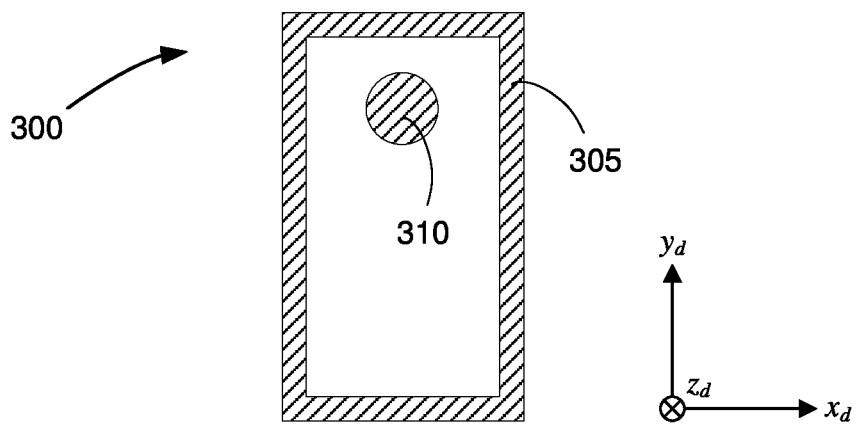
FIGS. 2A-2C illustrate, in simplified form, the basic structure of a common pressure sensor, as well as one mounting technique.
Figure 2B:
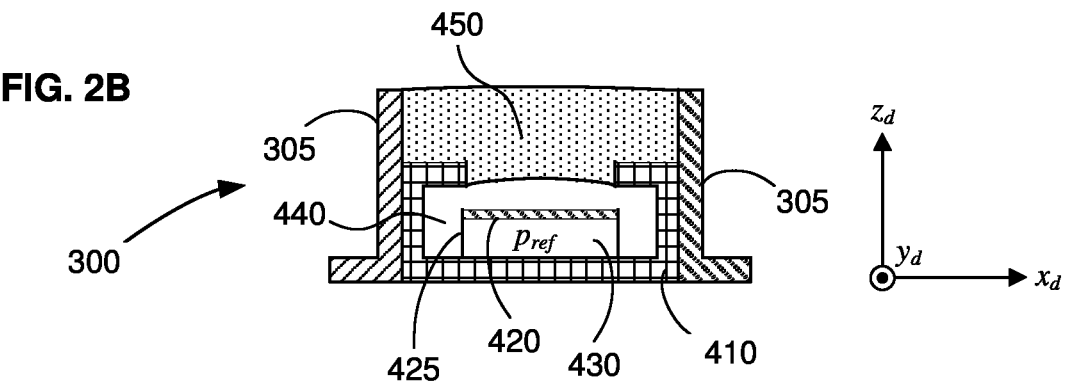

FIG. 2A illustrates a typical external structure for such a sensor 300, which includes a housing 305 and a sensor opening 310. The device extends primarily in an $x_d$-$y_d$ plane, such that a direction perpendicular to the opening 310 is primarily in a $z_d$ direction. FIG. 2B is a simplified cross-sectional view of such a MEMS pressure sensor. Within the external casing 305 is typically an inner housing 410. A sensor element 420 is mounted at the top of a sealed supporting structure 425, such that a gas 430 at a reference pressure $p_{ref}$ is contained between the sensor element 420 and the inner housing 410. In addition to various electrical bonding pads and, in many cases, a substrate, the sensor element 420 typically includes an opposing pair of cantilever-like, metallic prongs that extend towards each other, can flex, and that form a resistive element in a Wheatstone bridge. To protect the sensor element, seal the device, and still transmit pressure changes, an elastic material such as rubber 450 may be included to form a surface that is exposed to the ambient pressure, and is separated from the sensor element 420 by a cavity 440. Again, the structure shown in FIG. 2B is simplified, and different manufacturers of MEMS pressure sensors may construct their sensors differently. Common to such sensors, however, is that as the ambient pressure changes relative to $p_{ref}$, the resistive prongs of the sensor element 420 flex in response and the degree of flexing will change their resistance, which is measured using the Wheatstone bridge and may be converted into a pressure signal. In FIG. 2B, the rubber element 450 is shown as flexing slightly outward, indicating that the ambient pressure is less than $p_{ref}$. In the illustration, the direction of flex is in the $z_d$ direction.

Figure 2C:
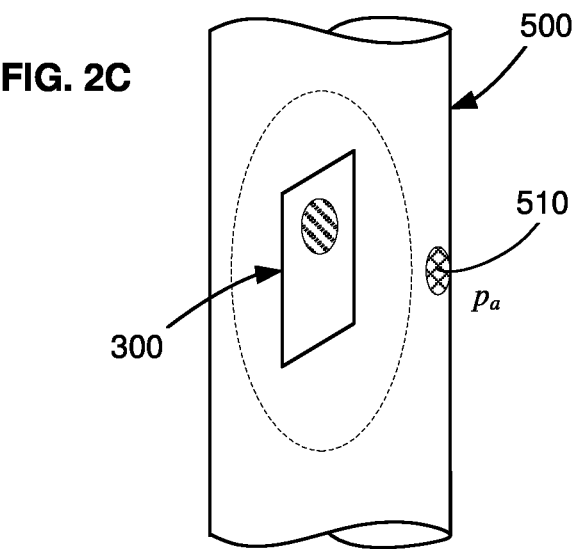

In FIG. 2C, a pressure sensor 300 is shown as being mounted on the inside of a structure 500, although it would also be possible to mount the pressure sensor directly on the external surface of the structure. The structure may have any geometry, such as having a circular, elliptical or any other symmetric, non-symmetric (such as shaped as an airfoil) or even irregular cross-section, Although it may be a common choice, it is not necessary for the structures within or on which all the different sensors are located to have the same geometry. Moreover, if the pressure sensor is mounted within the structure, the internal region or chamber in or on which the pressure sensor is mounted may, but need not, have the same cross-sectional geometry as the outer surface. In embodiments in which the pressure sensors are mounted inside the structure, an aperture 510 is provided in the structure so that the ambient pressure $p_a$ immediately at the aperture 510 is also the pressure sensed by the sensor 300. The aperture 510 should therefore be large enough to allow internal pressure equalization rapid enough to avoid unacceptable lag in altitude measurements, but small enough to maintain structural integrity and prevent such things as rain and dust from getting in.

Figure 3A:
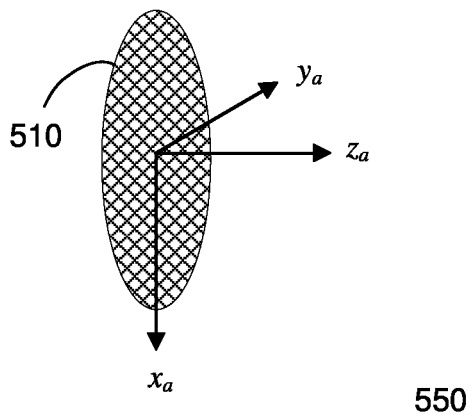
FIGS. 3A-3G show the effect of orientation relative to air flow on a pressure sensor.
Figure 3B:
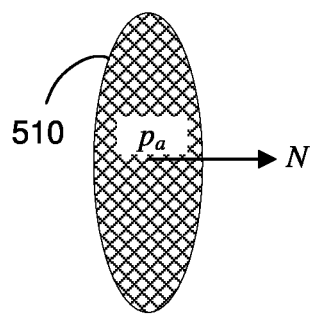

The aperture 510 will in many cases be circular, elliptical, or rectangular, but it may have any other shape. Merely by way of example, assume that the aperture 510 is circular. As FIG. 3A illustrates, the boundaries of the aperture 510 may lie generally in a $x_a$-$y_a$ plane (assuming the illustrated $x_a$-$y_a$-$z_a$ coordinate system) although more complicated boundary shapes are also possible. In FIG. 3B, the arrow labeled N illustrates a direction that is normal relative to the plane of the aperture 510 boundary, that is, that is orthogonal to both the $x_a$ and $y_a$ axes. It is not necessary that the direction orthogonal to the surface of the sensor element 420 ($z_d$ as shown in FIG. 2B) is the same as the normal direction N (parallel to $z_a$ as shown in FIG. 3A).

FIGS. 3B-3F illustrate how pressure changes depending on the orientation of the normal direction N relative to the direction of apparent airflow. With reference to FIG. 3B, assume that there is no airflow at all. In this case, the pressure at the aperture is shown as $p_a$. All other factors such as temperature being equal, and assuming the aperture is large enough to allow for rapid pressure equalization immediately inside and outside the aperture, the pressure that the pressure sensor 300 would sense in this case should be equal to the ambient pressure $p_a$.

Figure 3C:
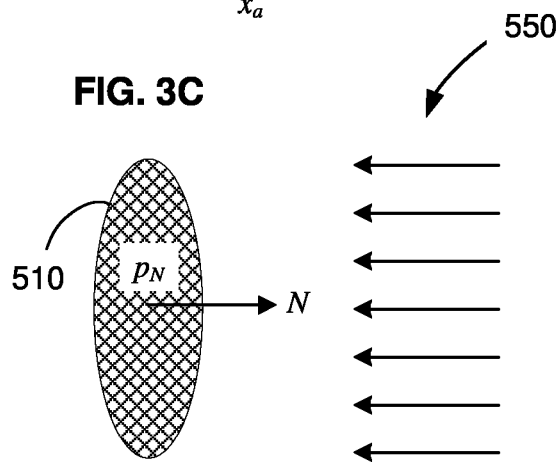
Figure 3D:
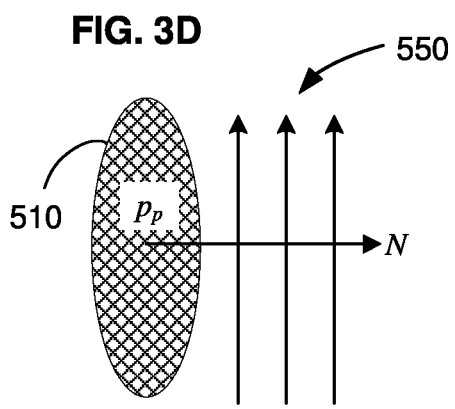
Figure 3E:
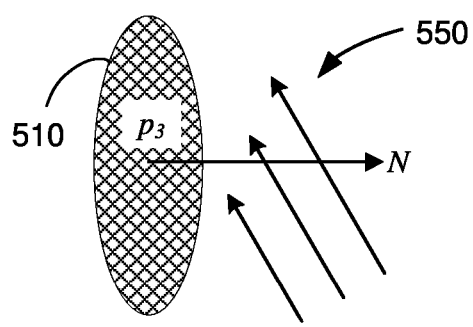
Figure 3F:
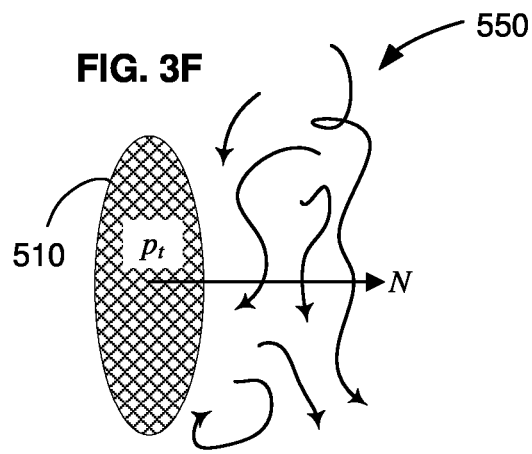

Assume, however, that the combination of UAV motion and wind is such that the apparent airflow 550 is directly opposite that of the normal direction N. This situation is illustrated in FIG. 3C, where the pressure sensed at the aperture is $p_N$. In FIG. 3D, the airflow is parallel to the aperture opening, such that the sensed pressure is $p_p$. In FIG. 3E, the apparent direction of airflow is neither perpendicular nor parallel, but rather with positive components in all three directions, yielding a sensed pressure at the aperture opening of $p_3$. Finally, in FIG. 3F, the airflow at the aperture 510 is turbulent, causing a pressure $p_t$.

Other factors being equal, the pressure $p_N$ will typically be greater than the pressures $p_3$ and $p_p$. Although in most cases less than $p_N$, the turbulent pressure $p_t$ will typically fluctuate rapidly and unpredictably. Moreover, the steamlines across the aperture in FIGS. 3C-E appear parallel, but this is an idealized illustration only—in actual embodiments, near any aperture, streamlines may be parallel, converge (such as over curved surfaces, where the Bernoulli effect may arise), diverge, swirl, or be partially or substantially chaotic, such as in regions of turbulence. The estimate of HAGL of the UAV may thus vary considerably depending on apparent airflow at the different apertures 510 even if the actual HAGL is constant. Even sensors that directly yield altitude values will still base their values on sensed pressure, such that this discussion of orientation-dependent pressure differences applies equally to them.

The normal direction N may be used to define an "orientation" of the aperture, and thus of the pressure sensing arrangement as a whole. Any other direction may be used to define the orientation of a pressure sensing arrangement, but this direction should better be defined consistently for different pressure sensor arrangements. For example, instead of apertures in the UAV structure, a tube between a pressure sensor 300 and the ambient air could be used to transmit ambient pressure to the sensor, in which case the direction the tube extends into the outside air could define the orientation, or the opening of the tube could be the aperture used to define orientation.

Figure 3G:
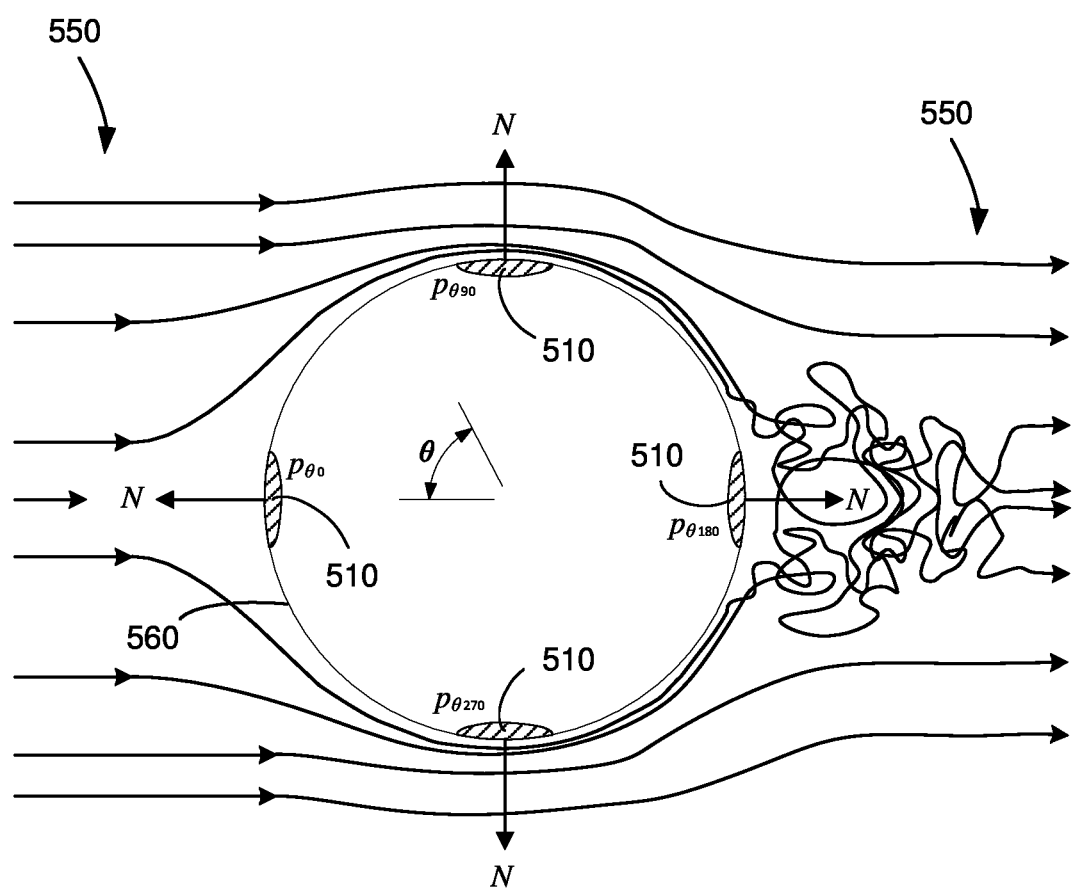

In embodiments of the disclosure, multiple pressure sensors are mounted with different orientations on the UAV. The sensed pressure values from the different sensors are then weighted and averaged to produce a composite pressure signal $p_{comp}$ that may then be used in altitude calculations. To illustrate this, FIG. 3G illustrates four pressure sensing arrangements mounted in a structure 560 with orientations at 0°, 90°, 180°, and 270° as defined by the angle θ, and whose respective aperture pressures are $p_{\theta 0}$, $p_{\theta 90}$, $p_{\theta 180}$, and $p_{\theta 270}$. As shown, and merely by way of example, the structure 560 is cylindrical and, the sensor at θ=0° is oriented directly into an oncoming airflow 550. Recall, however, that the actual airflow around different portions of a UAV will typically be much more complicated than what is illustrated even in the absence of wind, and even when hovering, because of, among other factors, propeller downwash. Nonetheless, FIG. 3G illustrates the general principle of multiple pressure measurements used in embodiments of the disclosure.

Other factors being equal, the pressure $p_{\theta 0}$ will probably be the highest of the four, and higher than the pressures $p_{\theta 90}$ and $p_{\theta 270}$, where there may still be laminar flow with more dense streamlines. The pressure sensor oriented at the position θ=180°, depending on the velocity of the UAV relative to the surrounding airflow, may lie in a region of turbulence, that is, in an area where there has been boundary layer separation. In any case, the pressures sensed by the different sensors will likely be different and the relationship may change as the velocity of the UAV changes relative to the ambient airflow, propeller power, etc.

Figure 4:
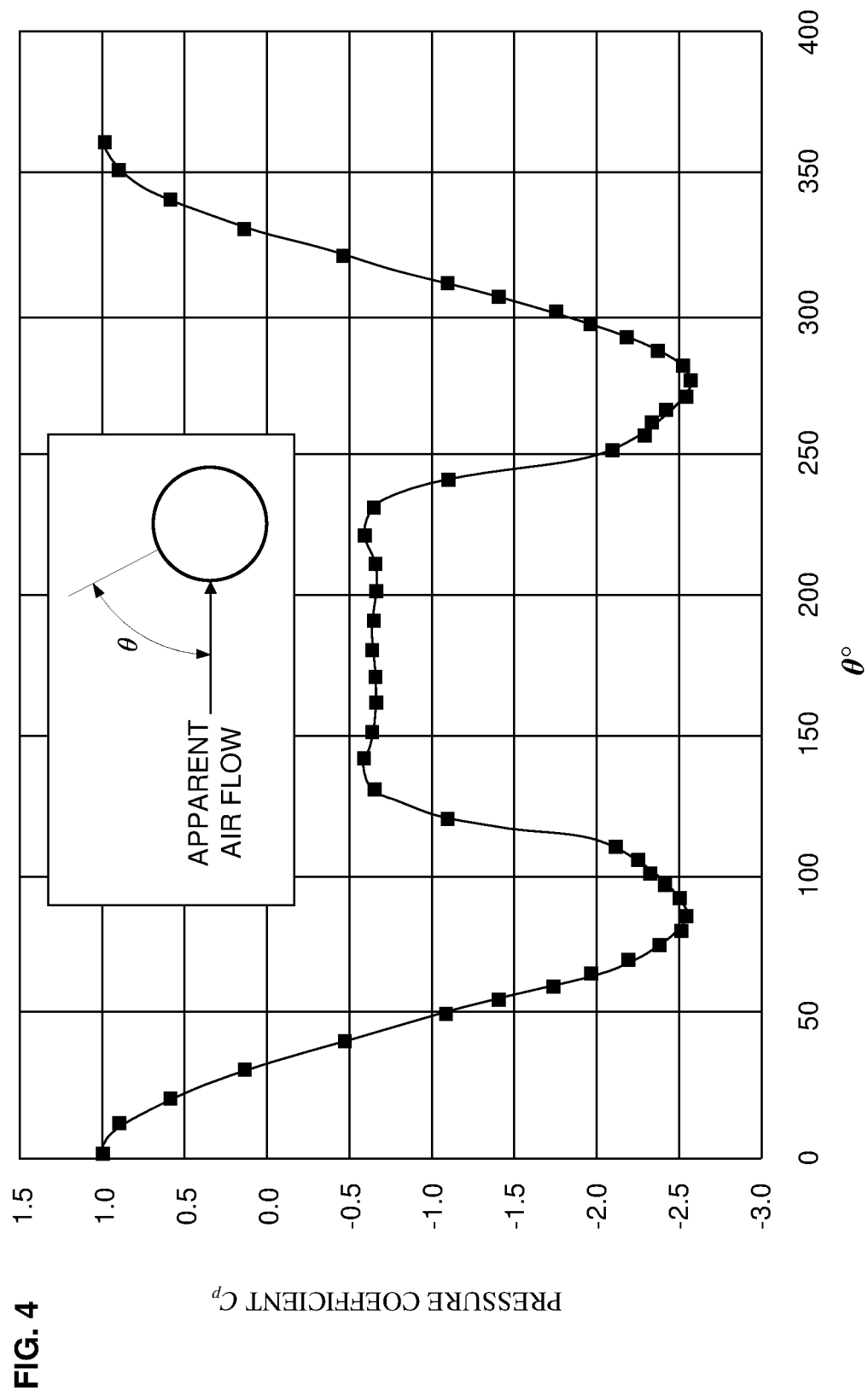
FIG. 4 illustrates pressure distribution around a cylinder relative to an apparent air flow.

FIG. 4 illustrates one example of a pressure distribution caused by an apparent air inflow about a cylinder—the illustrated graph shows a dimensionless pressure coefficient Cp, corresponding to a measure of deviation from a known correct value, as a function of the angular position θ (in degrees) relative to the direction of inflow. The illustrated pressure distribution graph is qualitatively representative of what will commonly occur about cylindrical support structures of a UAV moving at characteristic speeds, but the actual distribution for even an ideal cylinder unaffected by other structures will in practice vary depending on surface properties (such as smoothness), airflow velocity, etc.

As one would expect, the highest pressure is found at θ=0, that is, at the point facing directly into the airflow. Pressure minima occur at or near the θ=90 and θ=180 in the regions where the Bernoulli effect will be the greatest. On the "lee" side of the cylinder, in the region centered roughly about θ=90 the pressure lies between the maximum and minimum.

Figure 5:
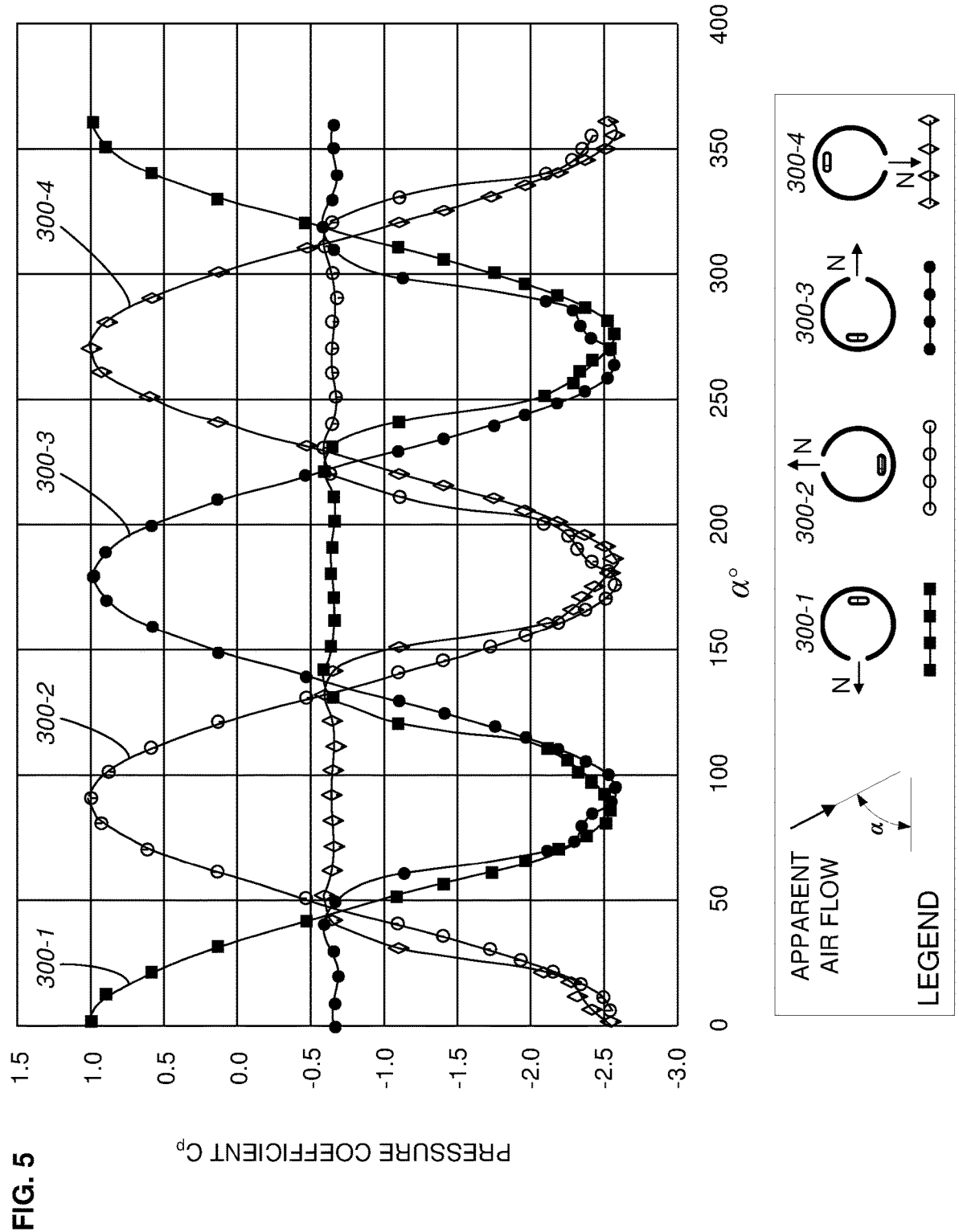
FIG. 5 illustrates pressure distribution curves for four sensors having different angular orientations about a cylinder.

Now see FIG. 5 and consider four pressure sensors 300-1, 300-2, 300-3, and 300-4, mounted in or on a cylindrical structure with 90-degree separation of orientation. Let the orientation of sensor 300-1 be at an angular position α=0°. When the apparent air inflow is also from the direction α=0°, that is, parallel but opposite to the normal direction of sensor 300-1, then the pressure distribution around the cylinder will be roughly as in FIG. 4, as illustrated by the curve also marked 300-1 (with the "square" dots). As the air inflow changes relative to the position of the sensors, so too does the pressure distribution. The four pressure distribution profiles shown in FIG. 5 correspond, by way of example, to pressures sensed by the respective sensors 300-1, 300-2, 300-3, 300-4 as the air inflow direction varies over the range α=[0°, 360°]. Thus, FIG. 5 shows the pressure distribution curve of FIG. 4 shifted in 90-degree increments corresponding to changes in air inflow direction.

The curves shown in FIG. 5 are obtained for sensors in an idealized environment merely for the sake of simplicity. For example, the sensors are located with 90° spacing, the mounting structures are substantially cylindrical as in FIG. 4, the orientations of the sensors lie substantially in the same plane or are rotations of each other relative to some axis (such as a vertical axis of the UAV), and the flow of apparent air is substantially in the same direction and with the same velocity. Embodiments of this disclosure do not depend on any such assumptions. For example, as mentioned elsewhere, the relative spacing can may be other than 90°, and one or more of the supporting structures could be other than cylindrical, and the sensor orientations may be in any chosen direction relative to each other. Moreover, the apparent air flow in actual situations will generally be much more complex than a simple unidirectional stream, especially considering that the UAV may be moving in all three x-y-z directions (see FIG. 1), yawing, and also generating downwash from several propellers.

Nonetheless, FIG. 5 serves to illustrate not only how sensed pressure may be a function of the angle of a sensor's orientation and apparent air flow angle, but also one consequential difference between the structure of a device such as a typical UAV and some other aerial devices such as helicopters and airplanes: A typical UAV often may be rotated in flight about a vertical axis, that is, yawed up to and including 360°; consequently, it may not have any predetermined "fore" and "aft", at least from the aerodynamic perspective, even though one may also choose to define "forward" functionally in terms of the mounting direction of a camera. Whereas one may rely on certain fixed assumptions about the mounting of pressure sensors on airplanes and helicopters (including pitot-static tube arrangements), such as that a particular sensor may generally be oriented in a given direction relative to apparent air flow, these assumptions typically do not apply in the case of a UAV. As such the air pressure field that UAV sensors are exposed to during even routine flight may be much more variable than is the case with sensors on vehicles such as helicopters and airplanes.

In order to reduce the likelihood of too great correlation between the different pressure sensors, they are oriented so as to be substantially equally spaced angularly about the UAV, which will also allow for consistent processing regardless of the direction in which UAV is moving. For example, if more than one pressure sensor is oriented in substantially the same direction as another, their presumably relatively similar values may contribute more to the weighted average $p_{comp}$ than they should. In other words, given n pressure sensors, they are mounted so that their normal directions are spaced 360/n degrees apart relative to a central vertical axis of the UAV. This is not an absolute requirement for embodiments of the disclosure, however, and designers may take into account such factors as non-symmetric construction when mounting the pressure sensors for proper measurement.

Figure 7:
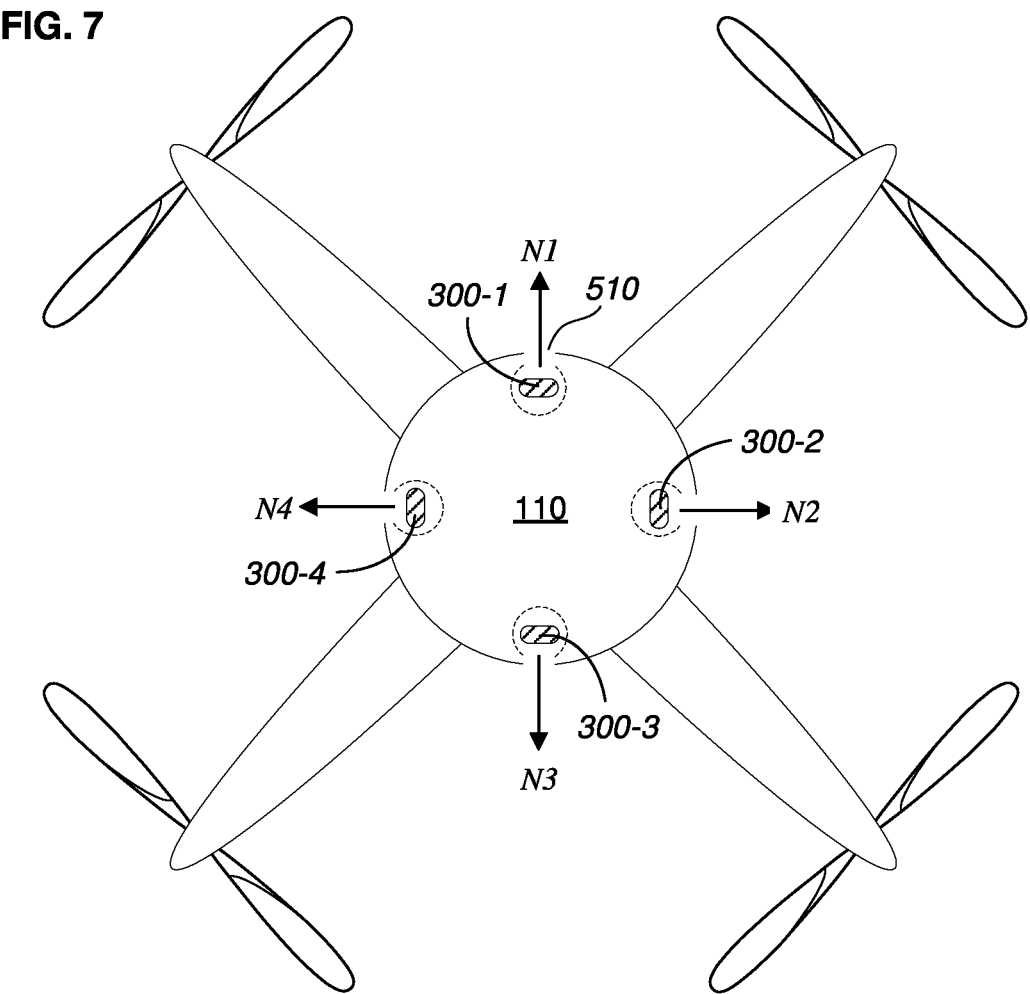

FIG. 6 is a simplified view from underneath of a UAV in which four pressure sensors 300-1, 300-2, 300-3, 300-4 are mounted in rail-like landing gear 130, with apertures 510 and thus sensing orientations N1, N2, N3, N4 spaced 90° apart. In the UAV illustrated in FIG. 7, the four pressure sensors are mounted within the central body 110 of the UAV, again with 90° separation in their orientation directions.

Figure 8:
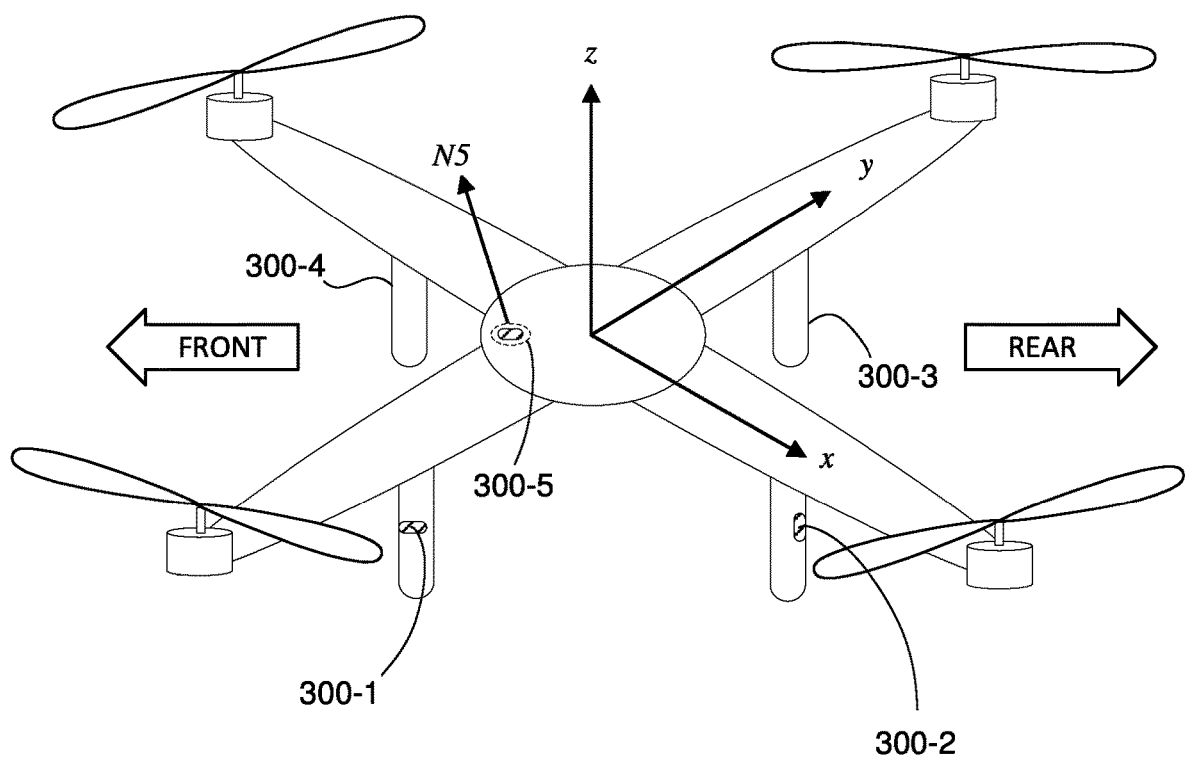

As FIG. 8 illustrates, it is not necessary for all pressure sensors to be mounted in the same UAV structures. In this example, four sensors are again mounted in the landing gear, but a fifth sensor 300-5 is mounted in the body 110 having an orientation that is "off-axis", that is, not parallel to any of the x-y-z axes. This might be advantageous for some UAVs that have a primary direction of motion, that is a "Front"; for example, the Front direction might be the direction in which the camera is oriented, with a "Rear" direction opposite. In this case, one might assume that the UAV will more often be moving in the Front direction than otherwise and mount the pressure sensors accordingly. In other embodiments, it would be possible to mount pressure sensors having orientations both upward and downward components (in the z direction) in the body or arms or elsewhere, for example, to better take into account differential pressures caused by vertical and/or horizontal motion of the UAV.

It would also be possible to mount one or more of the pressure sensors on extenders such as rods that extend away from the rest of the UAV, for example, so that it will be in an area of less turbulence, even above the propellers, or in a location where pressure values may be assumed to be less dependent on the direction of movement of the UAV. In embodiments in which there the propulsion mechanism is shrouded, such as with ducted fan propulsion, the sensors could likewise be mounted on and spaced around one or more of the shrouds.

When mounting the sensors 300 on structures such as landing gear legs (see FIGS. 1 and 8), or the vertical support of horizontal landing rails, the apertures 510 are positioned on the UAV so as to reduce undesirable interference from the propellers and/or to protect the sensors from physical damage. For example, the sensors may be placed roughly ⅓ to ⅔ of the total length of the landing gear: depending on the geometry of the UAV structure above them, placing them too high may cause them to suffer too much from propeller downwash, whereas placing them too low may lead to damage or impact by, for example, foreign objects such as ground water, vegetation, etc., during taking-off and landing. The proper positioning may be determined by testing by the UAV designer or manufacturer.

Now assume that n pressure sensing arrangements (however oriented) are built into the UAV. A composite sensed pressure value $p_{comp}$ may then be calculated as the weighted average of the pressures sensed by the different sensors:

$$p_{comp} = \frac{1}{kn} \sum_{i=1}^{n} w_i p_i$$

$$\text{where } k = \sum_{i=1}^{n} w_i$$

Although a common choice for weighted averages is for k=1, any other k value may be chosen to provide for simultaneous scaling of $p_{comp}$ if needed; k thus acts as a scaling and normalization factor for the weighted sum.

If sensors such as barometric altimeters are used instead of pressure sensors, the weighted average of their respective output altitude values could be computed instead, with no need for later separate computation of altitude. Even in this case, however, note that the sensor output data is pressure-dependent, since a pressure sensor is at the heart of such sensors as well.

Depending on the placement and orientation of the pressure sensors, above-ambient pressure readings such as may be caused by flying directly into the wind may at least partially be "canceled out" by below-ambient pressure readings on the downwind the side of the moving UAV. FIG. 5 illustrates one example of such "cancellation": If the UAV is flying such that the angle of apparent air flow is from about $\alpha=200°$, then sensor 300-3 has a $C_p$ of around +0.6, whereas the sensor 300-1, whose orientation is opposite that of sensor 300-3, at that apparent air flow angle is about −0.6 One other advantage of the $p_{comp}$ computation is that if the circuitry of the UAV senses failure of any of the pressure sensors, for example, or its output signal is outside of a predetermined acceptable range or differs by more than a threshold percentage or amount from the value of the other sensors, then it may be effectively "ignored" simply by setting its weight to zero and decrementing the value n by one.

In the simplest case, all of the weights could be set to one, for example, if the direction of flight or angular orientation about the z-axis of the UAV may change unpredictably. The weights $w_i$ may, however, also be adjusted dynamically based on UAV orientation and flight characteristics.

The proper weights under different flight circumstances made be determined through pre-flight calibration either by the vendor or during an in-flight calibration procedure under the control of the user. For example, the UAV could be flown at a known HAGL with different orientations and velocities and the actual sensed pressure values may be stored in the UAV. Weights can then be assigned to the different pressure values so as to yield the correct, known HAGL.

It would also be possible to have different sets of weights stored in the UAV for different flight scenarios. For example, the slower the UAV moves relative to the wind, the smaller the differences in sensed pressure may be, such that more equal weights may be appropriate.

Sets of weights could then be stored in the UAV and applied according to the circumstances. For example, during hovering, with minimal motion in any direction, the primary factor causing deviation of sensed pressure from the actual ambient pressure will be propeller downwash, which is likely to be turbulent. If the pressure sensors are oriented such that they are exposed to downwash approximately the same, for example, they are mounted on equally spaced legs of a substantially symmetrical UAV, then there would be no reason to weight one sensor's pressure value more than another and "hovering weights" (for example, all equal) could be applied. If sensors less affected by downwash, such as on the UAV body or otherwise better shielded, are included in the UAV, then the weights for these sensors may be increased relative to those known to be more directly exposed to downwash.

On the other hand, if the UAV is flying fast in a given direction, then the pressure sensor located on the "lee" side of a structure (such as illustrated in FIG. 3G) may be subjected to significant turbulence, such that its pressure value may be much less stable and reliable than others and should have its weight reduced. The weights may also be adjusted as a function of which sensor is most oriented in the direction of UAV travel, which may change, for example, because the user has commanded the UAV to yaw so as to aim the camera in a different direction while the UAV otherwise maintains the same flight path, or simply because the user wants to the UAV to fly somewhere else.

Similarly, if the UAV processing system senses that the pressure value of a given sensor fluctuates too much and too rapidly, such that it deviates statistically from its own average value by more than a threshold value during a period of relatively unchanging flight conditions, then its weight may also be reduced. This may also be used for a simplified, time-averaged weighting scheme: pressure values for each sensor could be stored at a chosen sampling rate over a sampling interval. The weight for each sensor could then be made a function of the RMS value, variance, standard deviation, max-min difference, or other statistical measure of its stored, sampled values. A sensor in an area of turbulent flow would thus have its weight reduced, whereas sensors outputting relatively stable values would be weighted higher. Note that such dynamic weight "adjustment" could include removing the output of one or more sensors from the altitude determination. This could be done by disabling one or more of the sensors by depowering them, or setting the corresponding weight(s) to zero. Which sensors are "removed" from consideration may also vary, depending on their orientations relative to the flight path or assumed or inferred apparent air flow.

As for "inferring" apparent air flow, note that FIG. 5 illustrates one way in which this may be done: During a calibration phase, the UAV may be maneuvered at a known altitude through a full 360° of yaw while in otherwise in substantially straight and level flight at a substantially constant velocity. The output values of the different sensors may then be sampled to build up data representing a sensed relative pressure-vs-yaw (corresponding to relative apparent air flow) angle curve of a type similar to what FIG. 5 illustrates. If actual altitude is known during calibration, a set of weights for each of a set of apparent air flow angles may then be computed that, when used in the weighted average formula above, yield the correct altitude for each angle. Later, in actual operation, the sensed pressure values may be compared with the different pressure-vs-air flow angle curves to estimate the actual air flow angle, and thus indicate which set of weights to apply.

This need not be precise to be useful. For example, if the actual sensed pressure value of sensor 300-2 (see FIG. 5) is greater than those for 300-3 and 300-4, but the value sensed from 300-4 lies in between, then the system may infer that the UAV is flying with an angular orientation such that the apparent air flow angle $\alpha$ most likely lies in the range of approximately $50<\alpha<120$ and could choose a set of weights determined for that range.

Assume that, as a result of calibration by measuring sensed pressure values from each of four sensors, that pressure-vs-angle profiles such as those illustrated in FIG. 5 are obtained. (Again, actual profiles are likely to be less uniform, since FIG. 5 represents a simplified, illustrative example.) In FIG. 5, the composite graph can be viewed as having four substantially similar portions, corresponding roughly to the angle ranges in which the different sensors are oriented "downwind" and exhibit a $C_p$ that is substantially constant at about $C_p=-0.65$. Over each such range, the "upwind" sensor's $C_p$ value is greater than the "downwind" sensor's by about 90% and much as the other two "cross-wind" sensors' values are below it. For example, for $\alpha=90°$, the value for sensor 300-2 is about 1.0 (1.6 above the value of sensor 300-4), whereas the values sensed by sensors 300-1 and 300-3 lie at about −2.5 (1.85 below the value of sensor 300-4).

The UAV's processing system, for example, its flight control component (see FIG. 10), may then be able to determine which portion of the profile "graph" the UAV is flying in by determining which sensor's value lies between the maximum sensed value and two other sensed valued. If the compiled profiles are as in FIG. 5, for example, and the pressure value for sensor 300-4 is higher than that of sensor 300-2, which is higher than that of both sensors 300-1 and 300-3, the system may conclude that weights corresponding to an angular range of about $240<\alpha<320$ should be applied.

Weights may then be chosen such that the weighted average of the sensed values, possibly with a constant offset, over each angular range, yields an altitude value as close as possible to the known altitude during calibration. For other numbers and configurations of sensors, in actual calibration conditions, the pressure-vs-angle profiles will usually be more complicated, possibly with more different sets of weights for more angular ranges. A similar procedure as described above may be followed in such cases as well to determine weights that produce an acceptably accurate altitude value during calibration, and therefore improved accuracy also during actual flight conditions.

Note that weights need not be applied to sensor pressure output values, for later computation of altitude, but may instead be applied to the altitude values that correspond to each sensor pressure output values. In other words, the system could compute an altitude value based on each sensor's output value, and then the different altitude values could be weighted and averaged instead.

In short, an embodiment may be configured for in-flight, adaptive weighting of pressure sensor values. At take-off, weights could thus be set equal, but change during flight as flight characteristics change. Different algorithms may be used to compute weights, which may be based on calibration or in-flight adaptation.

Weights may therefore be determined for a variety of flight circumstances, including as a function of velocity and orientation of the UAV as a whole. Note that this might also include a calibration for ascent and descent (z-axis velocity)—especially descent will often be as fast as maximum lateral velocity. UAV velocity may be measured in any known manner, such as using inertial sensors, GPS signals or even, roughly, as a calibrated function of the relative power applied to the different propulsion systems.

The composite pressure value may then be used to calculate HAGL in any known manner. For example, at the typical absolute altitudes at which users typically operate recreational and commercial UAVs, and assuming hydrostatic conditions, the known barometric formula for air can be reduced to:

$$h = h0 + c^* \ln(p_0/p_{sensed})$$

where h0 is zero-level height (in most cases here, the ground, such that h0=0), h is the height above $h_0$, $p_0$ is the zero-level pressure, $p_{sensed}$ is the sensed pressure, and c is a constant computed as a function of g, M, R, and T, where g is the gravitational constant, M is the molar mass of air, R is the gas constant of dry air, and T is the standard temperature in Kelvin. If the sensors included in the UAV provide altitude values directly, it will of course not be necessary to separately evaluate any pressure-to-altitude formula.

Since HAGL is a function of a pressure differential between a sensed pressure and a zero-level pressure $p_0$, it is also necessary to determine that zero-level pressure. (The internal reference pressure $p_{ref}$ of the pressure sensor itself is generally set by the manufacturer.) Any known calibration method may be used to determine such a zero-level pressure. For example, with the UAV at ground level, either the UAV itself, automatically, may sense the current pressure, when it is powered on, but before the propellers are in motion, or the user may perform any calibration procedure specified by the manufacturer, which may involve sending a signal via the controller 200 to use the currently sensed pressure as the zero-level pressure. Unlike in the prior art, however, the UAV according to embodiments of this disclosure could determine the zero-level pressure based on not only one pressure sensor (which is an option), but also by calculating the at-rest $p_{comp}$ with all weights set equal.

As an alternative, or in addition to determining an at-rest zero-pressure value $p_0$, circuitry in the UAV could also compute $p_{comp}$ within a predetermined number of seconds after power is applied to the propellers. This would allow the UAV to determine a zero-level pressure in the presence of propeller downwash. In order to avoid the influence of ground effect from the propeller downwash, this determination of such an in-flight zero-level pressure may be set to take place either immediately upon powering the propellers, or after a time when the UAV may be assumed, based on known ascent characteristics, to be far enough away from the ground to avoid any ground effect. It would also be possible to include more than one measurement for zero-level pressure such as both at-rest, immediately upon propeller activation, and after an assumed time for clearance of any ground effect. The different values could then be used by the UAV for automatic determination of a height "buffer", below which it automatically reduces vertical velocity.

In the discussion above, it is implied that the computation of $p_{comp}$ and the determination of $p_0$ take place in the UAV. This is one possibility. As an alternative, the UAV could transmit sensed pressure values back to the controller 200, whose processing circuitry could perform either or both of these calculations instead. It would also be possible for the controller to transmit a $p_0$ to the UAV derived, for example, from a higher-precision pressure sensor in the controller, or by user input of a value obtained, for example, from a local source such as local air traffic control or meteorological station.

Figure 9:
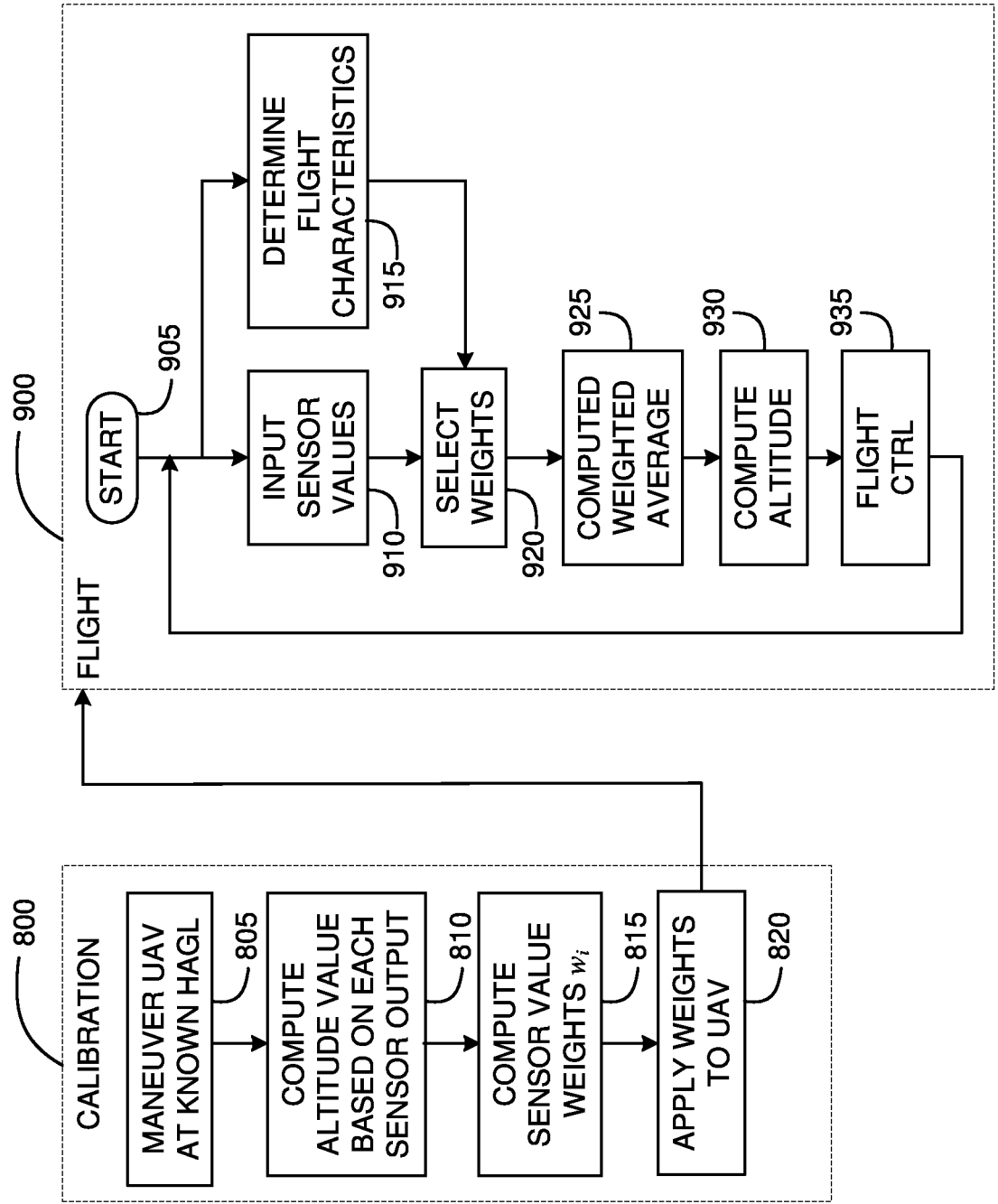
FIG. 9 is a flowchart that illustrates operational steps that may be included in an embodiment of a UAV.

FIG. 9 is a flowchart that illustrates the main operational steps of one embodiment. In a calibration phase (800), the UAV may be maneuvered at a known HAGL (805), which could be stationary, at zero-level. The output values of the onboard sensors, are then sensed, for example to compile pressure-vs-air flow angle profiles. The output values may then be converted into corresponding altitude values (810), from which weights or multiple sets of weights may be computed (815). These weights or weight sets may then be passed to the UAV (820), for example, via wireless or wired uploading, or may be pre-stored in the UAV's storage component, for example, in the case in which the UAV manufacturer performs the calibration.

During the UAV flight phase (900), the UAV is activated, that is, started (905); for example, it may be powered on or powered enough for take-off. While in flight, the UAV processing circuitry may input the values generated by the onboard sensors (910) and, possibly based on current flight characteristics (915), which may be determined using other onboard hardware and software, selects which weights (920) to use in computing a weighted average (925) that is then used to compute an altitude estimate (930). As mentioned above, examples of flight characteristics that may be considered are yaw orientation, velocity, estimated apparent air flow angle, etc. In some embodiments, the computed altitude value is passed to the UAV's flight control system (935), for example, to enable an altitude component of station-keeping, or to ensure that the UAV does not exceed a maximum HAGL. In other embodiments, the UAV may be configured simply to transmit its current altitude to the controller 200, for example, simply for display to the user.

As is explained above, several of the steps illustrated in FIG. 9 are optional. For example, in one embodiment, weights for the different sensors could be pre-set to be equal, in effect simply averaging the sensor values without weighting. In such an embodiment, there will be no need to compute altitude values or weights (810, 815) at all, or to make a weighting suggestion based on flight characteristics (915). Instead, the only calibration needed, if at all, would be to set initial values in the UAV to match a known zero-level reference altitude.

Figure 10:
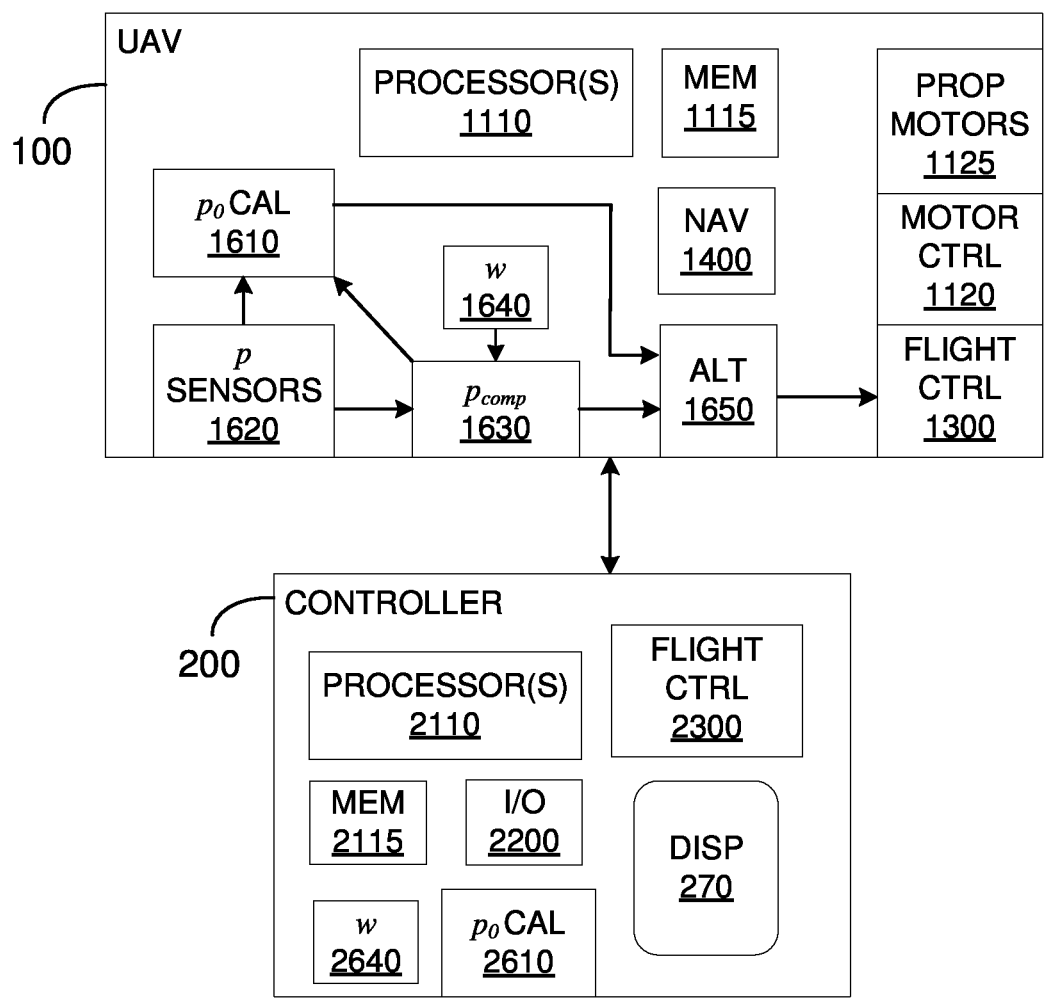
FIG. 10 illustrates and example of hardware and software components in a UAV and controller involved in altitude estimation and flight control.

FIG. 10 illustrates hardware and software components typically found in a UAV and its controller. Merely for the sake of clarity, some conventional components such as batteries, radio transceivers, camera control and image processing modules, A/D conversion and scaling circuitry for, among other signals, sensed pressure signals, and other circuitry and software are not illustrated or described.

At the heart of the circuitry included within the UAV 100 is one or more processors 1110, which may be a known or customized CPU, as well as, in some systems, associated high-speed, specialized devices such as microprocessors, coprocessors, PFGAs, etc. Data and code defining the various software modules within the UAV is stored in one or more devices such as a memory 1115, which may be volatile, including high-speed memory devices, or nonvolatile, such as permanent storage devices, or both. The line between "memory" and "storage" is more and more blurred nowadays by the prevalence of such technologies as SSD and NVRAM, etc. This disclosure does not presuppose any particular memory or storage technology as long as a sufficient amount is made available to satisfy the operational needs of the UAV. Motor control circuitry 1120 is included to control the operation of the motors 1125 that control the power to and drive the propellers (or other propulsion devices) 125.

Flight control circuitry 1300, which may comprise hardware, firmware, and/or executable code, applies flight commands to the motor control circuitry 1120 so that it may determine and apply corresponding motor power. The flight control circuitry operates according to whichever flight control routines and policies that have been designed into the UAV, in accordance with both user commands and internal flight control signals. The UAV may also include navigational circuitry 1400 such as GPS, inertial, or other location sensors, with accompanying and known software routines for processing the positional, velocity, and/or acceleration signals into a form suitable for flight control.

A module 1610 is included to either receive $p_0$ from an external source such as the controller 200, or to input at least one of the sensed pressure signals from a pressure-sensing module 1620 (which will include pressure sensors and their supporting and signal conversion circuitry) and either directly, or via a composite pressure computation module 1630, calibrate the UAVs pressure-sensing system by computing $p_0$.

The sensed pressure values from the different pressure sensors are applied to the pressure computation module 1630, which may, if they are not already stored as part of the module 1630, input the weights for the different pressure signals from a module 1640 and compute $p_{comp}$. The weight module 1640 may be implemented either separately, or simply as a space within the memory 1115. If different weight sets are implemented, they may be stored as part of the weight module 1640. The computed $p_{comp}$ value, along with the value $p_0$ may then be applied to an altitude computation module 1650, which computes, for example, HAGL (or other chosen defined altitude) using any known formula, such as the barometric formula.

The computed HAGL may then be passed to the flight control module 1300, which may then include the computed value in its flight control routine so as to, for example, maintain a fixed HAGL for hovering or level flight. As part of a flight control routine, the UAV could be configured to input from the controller a user-entered target HAGL, such that the flight control circuit commands ascent (or descent) of the UAV to the target HAGL. In implementations in which the current HAGL is displayed for the user (display field 271), the altitude computation module 1650 could also cause the currently computed HAGL to be transmitted back to the controller for display.

Computation of current the HAGL may be done on any chosen schedule, such as at fixed time intervals, or upon any change of motor control, or substantially continuously, such that a current HAGL value would be available to the flight control circuitry whenever it needs it.

The controller 200 will similarly include one or more processors 2110 and one or more volatile and/or non-volatile memory and/or storage components 2115 of any chosen technology or mix of technologies. An I/O interface 2200 may receive the inputs provided by the user and translate them into appropriate signals for processing. For example, movement of a joystick may be converted using well-known circuitry and methods into corresponding left-right, forward-backwards, up-down, or other commands.

As needed, the controller 200 may also include flight control circuitry and software 2300 to convert both automatic and user-directed flight controls and other information into any chosen form suitable for transmission to and interpretation by the UAV. For example, the signals corresponding to physical movement of a joystick 222, 224, may be A/D converted (if necessary), scaled, and formatted, and possibly combined with other control signals for transmission to the UAV, whose own flight control circuitry 1300 may in turn interpret and convert the transmitted data into appropriate motor commands. In cases where the zero-level pressure is transmitted from the controller to the UAV, the controller may also include a module 2610 to calibrate and compute $p_0$. The controller may also be provided with a module 2640 that stores or computes weights; for example, if the controller is configured to enable a user to select a particular type of flight profile, such as station-keeping, level flight, the controller could then transmit the corresponding pre-determined or pre-calibrated set of weights to the UAV for loading into its own weight module 1640.

Although not illustrated in the figures merely for the sake of simplicity, the UAV and the controller will typically include some form of system software and/or firmware to handle I/O and memory operations and the flow of code executed by the respective processor(s). This system software or firmware is usually customized for the UAV context, but may be based on conventional operating system technology as well.

Several of the components and modules within the UAV 100 and controller 200 are either comprised of or include "software", that is, computer executable code that is submitted to the processors for execution, along with conventional references to memory needed to fetch data used in execution of that code. Such executable code will itself be embodied within the storage devices 1115, 2115 of the respective systems. Furthermore, it is not necessary for all of the hardware and software (and/or firmware) components shown separately in the figures to be separate in practice; rather, any or all these may be implemented in single components. For example, the altitude computation module 1650 could incorporate and perform any or all of all the functions of the modules 1610, 1630, and 1640.

One of the other challenges of designing systems for estimating altitude in the context of typical commercial and recreational UAVs is their limitation in terms of size and weight. Complicated mechanical systems add weight, and elaborate circuitry requires power to run, both of which reduce battery life and flight time. An advantage of the embodiments described above is that they can improve the accuracy of altitude estimation with robust, low-weight, low-power components and simple yet adaptable computational routines, such that embodiments are well-suited for use even where the UAV is relatively light-weight, such as less than 2.0 kg, less than 1.5 kg, or even less than 1.0 kg.

What is claimed is:

1. A method comprising:
obtaining pressure-dependent data from a plurality of sensors, each mounted on a moving object with a respective primary orientation direction, the primary orientation directions of at least two of the sensors being different;
computing an altitude of the moving object based on the pressure-dependent data from the plurality of sensors, including:
determining a direction of motion of the moving object or a velocity of the moving object;
assigning a weight to the pressure-dependent data from each of the plurality of sensors in a weighted average according to the determined direction of motion or the determined velocity; and
computing the altitude as a function of the weighted average of the pressure-dependent data from the plurality of sensors; and
controlling a flight altitude of the moving object based on the computed altitude.

2. The method of claim 1, wherein computing the altitude of the moving object based on the pressure-dependent data from the plurality of sensors includes:
determining the direction of motion of the moving object; and
assigning the weight to the pressure-dependent data from each of the plurality of sensors in the weighted average according to the determined direction of motion.

3. The method of claim 1, wherein computing the altitude of the moving object based on the pressure-dependent data from the plurality of sensors includes:
determining the velocity of moving object; and
assigning the weight to the pressure-dependent data from each of the plurality of sensors in the weighted average according to the determined velocity.

4. The method of claim 1, further comprising:
determining that the pressure-dependent data from one of the sensors deviates from the pressure-dependent data of the other ones of the sensors by more than a threshold amount of discrepancy;
wherein the pressure-dependent data from the one of the sensors is precluded from computing the altitude of the moving object.

5. The method of claim 1, wherein the primary orientation directions of all the sensors are substantially perpendicular to a vertical direction.

6. The method of claim 1, further comprising defining the primary orientation direction of at least one of the sensors relative to an exterior boundary of an aperture through which the respective sensor is exposed to ambient pressure.

7. The method of claim 1, wherein the moving object is an unmanned aerial vehicle (UAV).

8. The method of claim 7, wherein the sensors are mounted on the UAV such that the primary orientation directions of at least one pair of the sensors are opposite to each other.

9. The method of claim 1, wherein assigning the weight to the pressure-dependent data from each of the plurality of sensors in the weighted average according to the determined direction of motion or the determined velocity includes:
assigning a first weight to the pressure-dependent data from a first sensor of the plurality of sensors that is located at a lee side of the moving object, and assigning a second weight larger than the first weight to the pressure-dependent data from a second sensor of the plurality of sensors that is located at a location other than the lee side of the moving object, the lee side of the moving object being a side of the moving object that is opposite to the determined direction of motion.

10. The method of claim 1, wherein assigning the weight to the pressure-dependent data from each of the plurality of sensors in the weighted average according to the determined direction of motion or the determined velocity includes:
assigning a first weight to the pressure-dependent data from a first sensor of the plurality of sensors that is oriented in the determined direction of motion of the moving object and assigning a second weight smaller than the first weight to the pressure-dependent data from a second sensor of the plurality of sensors that is oriented opposite to the determined direction of motion of the moving object.

11. An unmanned aerial vehicle (UAV) comprising:
a plurality of propulsion devices, each, when activated, causing a propulsion airflow substantially parallel to a vertical axis of the UAV;
a plurality of sensors, each generating pressure-dependent data and being mounted on the UAV with a respective primary orientation direction, the primary orientation directions of at least two of the sensors being different;
a storage component storing a plurality of per-sensor weights;
a navigation component configured to determine a direction of motion of the UAV or a velocity of the UAV; and
a processor configured to:
assign the plurality of per-sensor weights according to the determined direction of motion or the determined velocity; and
compute an altitude of the UAV as a function of an average, weighted by the per-sensor weights, of on the pressure-dependent data from the plurality of sensors.

12. The UAV of claim 11, wherein:
the navigation component is configured to determine the direction of motion of the UAV; and
the processor is further configured to assign the plurality of per-sensor weights according to the determined direction of motion.

13. The UAV of claim 11, wherein:
the navigation component is configured to determine the velocity of the UAV; and
the processor is further configured to assign the plurality of per-sensor weights according to the determined velocity.

14. The UAV of claim 11, further comprising a processing system configured to sense failure of at least one of the sensors and set to zero the weight corresponding to the at least one of the sensors.

15. The UAV of claim 11, wherein the primary orientation directions of all the sensors are substantially perpendicular to a vertical direction.

16. The UAV of claim 11, wherein the primary orientation direction of at least one of the sensors is defined relative to an exterior boundary of an aperture through which the respective sensor is exposed to ambient pressure.

17. The UAV of claim 11, wherein the sensors are mounted on the UAV such that the primary orientation directions of at least one pair of the sensors are opposite to each other.

18. The UAV of claim 11, wherein at least one of the sensors is vertically positioned in a central portion of a landing support member.

19. The UAV of claim 11, wherein at least one of the sensors is incorporated into a main body of the UAV.

20. A system comprising:
- a plurality of sensors, each generating respective pressure-dependent data and each being mounted on a moving object with a respective primary orientation direction, the primary orientation directions of at least two of the sensors being different; and
- a processor configured to:
  - compute an altitude of the moving object based on the pressure-dependent data from the plurality of sensors, including:
    - determining a direction of motion of the moving object or a velocity of the moving object;
    - assigning a weight to the pressure-dependent data from each of the plurality of sensors in a weighted average according to the determined direction of motion or the determined velocity; and
    - computing the altitude as a function of the weighted average of the pressure-dependent data from the plurality of sensors; and
  - control a flight altitude of the moving object based on the computed altitude.

* * * * *